(12) United States Patent
Iversen et al.

(10) Patent No.: US 10,985,544 B2
(45) Date of Patent: Apr. 20, 2021

(54) SUBSEA CONNECTOR WITH U-SHAPED CONFIGURATION

(71) Applicant: NEXANS, Courbevoie (FR)

(72) Inventors: Oyvind Iversen, Ski (NO); Bjorn Willy Kalheim, Oslo (NO)

(73) Assignee: NEXANS, Courbevoie (FR)

( * ) Notice: Subject to any disclaimer, the term of this patent is extended or adjusted under 35 U.S.C. 154(b) by 171 days.

(21) Appl. No.: 16/197,579

(22) Filed: Nov. 21, 2018

(65) Prior Publication Data

US 2019/0165559 A1 May 30, 2019

(30) Foreign Application Priority Data

Nov. 27, 2017 (NO) ................................. 20171890

(51) Int. Cl.
*H02G 15/10* (2006.01)
*H01R 13/631* (2006.01)
(Continued)

(52) U.S. Cl.
CPC ............... *H02G 15/10* (2013.01); *H01R 9/11* (2013.01); *H01R 13/03* (2013.01); *H01R 13/523* (2013.01);
(Continued)

(58) Field of Classification Search
None
See application file for complete search history.

(56) References Cited

U.S. PATENT DOCUMENTS 3,473,340 A * 10/1969 Ferrentino ............... H02G 1/10
405/166
3,982,059 A * 9/1976 Holland ................ H02G 15/06
174/73.1
(Continued)

FOREIGN PATENT DOCUMENTS

DE 19513618 10/1996
GB 2537360 10/2016
(Continued)

OTHER PUBLICATIONS

Norwegian Office Action dated Nov. 6, 2018.
Norwegian Search report dated May 16, 2018.

*Primary Examiner* — Binh B Tran
*Assistant Examiner* — Muhammed Azam
(74) *Attorney, Agent, or Firm* — Sofer & Haroun, LLP (57) ABSTRACT

A subsea connector (20) is provided for joining a first cable (2) having a first minimum bending radius (MBR) and a second cable (3) having a second minimum bending radius (MBR). The subsea connector is arranged with a first joint device (21, 53) for connection with the first cable and a second joint device (22, 54) for connection with the second cable (3). The subsea connector comprises a conductive member (25, 57) for transfer of electric power between the first and the second cable (2,3), the conductive member having, in an installed position, a U-shape configuration and the radius of curvature of the subsea connector is less than or equal to the first and second minimum bending radii such that at least a portion of the first cable (2) extending from connection with the first joining device (21,53) is arranged essentially parallel with at least a portion of the second cable (3) extending from connection with the second joint device (Continued)

(22,54). The invention also concerns a cable arrangement, a junction box and a method for assembly and installation of a flowline arrangement.

21 Claims, 8 Drawing Sheets (51) Int. Cl.

| | |
|---|---|
| *H01R 13/622* | (2006.01) |
| *H01R 9/11* | (2006.01) |
| *H01R 43/26* | (2006.01) |
| *H02G 1/14* | (2006.01) |
| *H01R 13/03* | (2006.01) |
| *H02G 15/14* | (2006.01) |
| *H01R 13/523* | (2006.01) |
| *H02G 1/10* | (2006.01) |
| *H02G 9/02* | (2006.01) |
| *H02G 9/00* | (2006.01) |

(52) U.S. Cl.
CPC ......... *H01R 13/622* (2013.01); *H01R 13/631* (2013.01); *H01R 43/26* (2013.01); *H02G 1/10* (2013.01); *H02G 1/14* (2013.01); *H02G 9/02* (2013.01); *H02G 15/14* (2013.01); *H02G 9/00* (2013.01)

(56) References Cited

U.S. PATENT DOCUMENTS

| | | | | | |
|---|---|---|---|---|---|
| 4,050,765 | A * | 9/1977 | Duesterhoeft | ....... | H01R 13/523 439/205 |
| 4,073,562 | A * | 2/1978 | Karlskind | ........... | H01R 13/523 439/199 |
| 4,142,770 | A * | 3/1979 | Butler, Jr. | ............ | H01R 13/523 439/140 |
| 4,415,764 | A * | 11/1983 | Priaroggia | ............... | H02G 9/02 174/37 |
| 5,861,575 | A * | 1/1999 | Broussard | ............ | G02B 6/4459 174/20 |
| 6,030,145 | A * | 2/2000 | Stewart, Jr. | ........... | E21B 17/015 405/171 |
| 6,768,859 | B2 * | 7/2004 | Milanowski | ......... | H02G 15/013 385/134 |
| 7,388,173 | B2 * | 6/2008 | Sundal | ..................... | H05B 3/56 219/213 |
| 8,358,206 | B2 * | 1/2013 | Huscher | .............. | B60R 16/0232 340/438 |
| 8,648,258 | B2 * | 2/2014 | Drouard | ............... | H02G 15/007 174/152 G |
| 8,753,133 | B1 * | 6/2014 | Errato, Jr. | ............ | H01R 13/562 439/108 |
| 9,088,147 | B2 * | 7/2015 | Dubois | .............. | H02G 15/1055 |
| 9,537,230 | B2 * | 1/2017 | Pope | .................. | H02G 15/1806 |
| 10,658,828 | B2 * | 5/2020 | Priser | ................... | G02B 6/4427 |
| 2002/0146922 | A1 * | 10/2002 | Wayman | .............. | H01R 13/631 439/136 |
| 2003/0159877 | A1 * | 8/2003 | Martin | ..................... | G01V 1/38 181/110 |
| 2004/0080119 | A1 * | 4/2004 | Goll | ..................... | H02G 15/013 277/607 |
| 2008/0085619 | A1 * | 4/2008 | Cadoret | ............... | H01R 13/533 439/153 |
| 2010/0146785 | A1 * | 6/2010 | Portas | .................... | H01B 13/22 29/868 |
| 2011/0298304 | A1 * | 12/2011 | Cotter | ................ | H01R 13/5224 307/147 |
| 2014/0345245 | A1 * | 11/2014 | Borch-Jensen | .......... | H02G 1/10 59/78.1 |
| 2015/0155650 | A1 * | 6/2015 | Larssen | ................... | H01R 11/11 439/271 |
| 2015/0159443 | A1 * | 6/2015 | Springett | ................. | H02G 1/10 166/360 |
| 2016/0036160 | A1 * | 2/2016 | Sales Casals | ........ | H01R 13/523 439/588 |
| 2016/0072219 | A1 * | 3/2016 | Christiansen | ........ | H01R 13/523 439/271 |
| 2017/0242210 | A1 * | 8/2017 | Armistead | ........... | G02B 6/3831 |
| 2017/0370981 | A1 * | 12/2017 | Hackl | ...................... | H02G 1/10 |
| 2019/0164666 | A1 * | 5/2019 | Copete Cano | .......... | H01B 7/14 |
| 2019/0165559 | A1 * | 5/2019 | Iversen | .................... | H01R 9/11 |
| 2019/0382085 | A1 * | 12/2019 | Bols | ........................ | B63B 35/03 |

FOREIGN PATENT DOCUMENTS

| | | |
|---|---|---|
| NO | 861992 | 11/1987 |
| WO | 2016192779 | 12/2016 |

* cited by examiner

PRIOR ART

FIG. 1

PRIOR ART

SUBSEA CONNECTOR WITH U-SHAPED CONFIGURATION

RELATED APPLICATIONS

This application claims the benefit of priority from Norwegian Patent Application No. 2017 1890, filed on Nov. 27, 2017, the entirety of which is incorporated by reference.

TECHNICAL FIELD

The invention relates to a subsea connector and a cable arrangement and junction box comprising the subsea connector as well as a method for installation of a flowline arrangement More specifically the subsea connector and the cable arrangement and junction box may be used for joining two cables in a side by side manner on a temporary or a more permanent basis.

BACKGROUND

The cables to be joined in accordance with the invention may be cables involved in a Direct Electrical Heating System (DEHS) or other installations where there is a need for cables to supply electrical energy. These installations may be arranged subsea or may be an offshore facility such as for instance an offshore windfarm.

The direct heating arrangement installed on a flowline provides an alternate solution to chemical injection for ensuring flow assurance in flowlines by preventing formation of hydrates and wax deposition. In accordance with the principle workings of the DEHS, the flowline temperature is controlled to be held over the threshold temperature at locations where formation of hydrates is likely to occur. The threshold temperature for hydrate formation is controlled by supplying heat to the contents of the flowline utilizing conductive features of the metallic flowline for generating heat in the flow line. Power to the DEH arrangement is provided from a top side location through a riser cable by means of a conductor arranged in the riser cable or a riser connecting cable whereto the riser cable is connected. The riser cable or the riser connecting cable is usually provided with two conductors. One of the conductors is connected to the flowline at a near end location of the flow line, and the other conductor is connected to a piggyback cable extending along the flowline to the far end of the flow line where the piggyback cable is connected to the flow line. Power is fed through the piggyback cable and is returned through the metallic flow line and through the sea water as the heating system is arranged in electrical connection with the sea water through sacrificial anodes. By this arrangement the temperature of the fluid within the flowline is kept above the threshold temperature and formation of hydrates is prevented.

The term "near end" is herein defined as a location of the flow line close to production facility which could be a platform or other production units, whereas "far end" defines the other opposite end of the flow line. The far end would typically be located at flow line destination area for instance in proximity to a subsea well or subsea equipment used for operation and service of the subsea well.

When the invention is to be used in DEH related operations, it may be employed for cables attached permanently or temporary on flowlines in a piggyback manner and could also be used for connection of cables that are not installed directly on the flowlines, but are located a distance away from the flowline for instance for supplying electrical energy to the cables installed on the flow line. The invention may also be used for other arrangements than DEH installation where two cables are to be installed subsea in a side by side or essentially parallel manner.

Cables, often high-voltage cables, used in subsea installation and also in DEH installation usually have a large sized cross sectional area of about 630-1600 $mm^2$. In some circumstances the diameter cross sectional area may even be larger than 1600 $mm^2$ but also cross section down to 240 $mm^2$ or less may be used for specific circumstances. Due to the large cross section/diameter of these cables, the minimum bending radius (MBR) of these cables will also have a large size. The bending radius is measured to the inside curvature of the cable when bending the cable, and the minimum bending radius (MBR) is defined as the smallest allowed bending radius to which the cable may safely be bent without causing damage to the cable during the actual installation and when arranged in a long-term installation position.

The minimum bending radius (MBR) of the high-voltage cables used in subsea installation, including DEH installations is about 1-3 meter or more, but usually about 2-2.5 m. DEH systems having a larger supply frequency may provide for employing cables with a smaller diameter, for instance a diameter of about 185 mm. These large sized minimum bending radii set considerable limitations when installing the cables, and especially so if the task to be solved demands installing the cables in a U-shaped pattern. For most cases laying of the cable in a U-shaped pattern is unattainable and this circumstance prevents the development of solutions where such a laying pattern may be advantageous for instance within the field of laying and handling of cables.

When installing flowlines with piggyback mounted cables, prior art laying procedure and available installation equipment has demanded that the laying of the flowlines with the piggyback mounted cables has started at the far end designation moving in direction towards the production facility (platform). This installation method has shown cumbersome and at some hydrocarbon exploration fields it has proven impossible to carry out.

Based on these mentioned challenges a need has evoked within the field to provide an improved solution for laying and handling cables that have minimum bending radius of a relative large size. Especially so in various demanding situations where relatively large diameter cables are required to be arranged in a side by side manner such as in a parallel laying pattern where the cables are to be joined, and also when laying flowlines with cables mounted in piggyback fashion.

Thus, an object of the invention is to provide a solution prepared for positioning the large diameter cables in a side by side laying pattern displaying a U-shape.

A further object is to provide a solution that is suitable for installment on flowlines in a piggyback manner. It is further an object of the invention to produce a solution that is suitable for installment when there is a need for a junction box.

It is also an object to provide a solution that facilitates the laying of flowlines with the piggyback strapped cable starting from the near end location.

SUMMARY

The invention concerns a subsea connector, cable arrangement and junction box comprising the subsea connector and a method for installation of a flowline assembly, has been set forth in the independent claims. Further additional features are set forth in the dependent claims.

A subsea connector for joining a first cable having a first minimum bending radius (MBR) and a second cable (3) having a second minimum bending radius (MBR). The subsea connector is arranged with a first joint device for connection with the first cable and a second joint device for connection with the second cable. The subsea connector comprises a conductive member for transfer of electric power between the first and the second cable. The conductive member having, in an installed position, a U-shape configuration. The radius of curvature of the subsea connector is less than or equal to the first and second minimum bending radii, such that at least a portion of the first cable extending from connection with the first joining device is arranged essentially parallel with at least a portion of the second cable extending from connection with the second joint device.

The configuration of the subsea connector ensures that the at least portion of the first cable and the at least portion of the second cable as extending from the joint devices are positioned essentially parallel to each other. By essentially parallel it should be understood that the at least portion of the first cable which extends from the first joint device and the at least portion of the second cable which extends from the second joint device are positioned with an essentially equal distance in between each other all along the length of these cable portions. As such in one aspect the whole length of the first and second cable may be arranged essentially parallel and the distance between the first cable and the second cable is equal along the whole length of these cables. In another aspect a portion of the length of the first and second cable may arranged essentially parallel displaying an equal distance in between each other proximate to the first and second joint device, whereas the distance between the remaining parts of the cable lengths deviates along the remaining parts of the cable lengths.

The radius of curvature of the subsea connector is measured to the inside curvature of the subsea connector in the installed position. The radius of curvature of the subsea connector has a value ensuring that the subsea connector display at least a portion of the first cable extending from connection with the first joining device essentially in an essentially parallel pattern with at least a portion of the second cable extending from connection with the second joint device. The radius of curvature of the subsea connector is defined in the range of about 0.1 meter to about the minimum bending radius (MBR) of the first or second cable.

The bending radius of the cable is measured to the inside curvature of the cable when bending the cable, and the minimum bending radius (MBR) is defined as the smallest allowed bending radius to which the cable may safely be bent without causing damage to the cable. The values of the minimum bending radius (MBR) of the first or second cable is specified in the following. This inventive subsea connector allows the connection of the cables having a relatively large diameter for instance 630-1600 mm$^2$. In some circumstances the diameter may even be larger than 1600 meters but also cross section down to 240 mm$^2$ or less may be used for specific circumstances.

The minimum bending radius (MBR) of each of the first and second cable is usually within the range of 1.5-3 m and the radius of curvature of the subsea connector may be as small as 0.1 meter. In other applications the radius of curvature of the subsea connector is defined as the minimum bending radius (MBR) of the first or second cable. Thus the radius of curvature of the subsea connector is defined in the range of about 0.1 meter to about the minimum bending radius (MBR) of the first or second cable.

The arrangement of the inventive subsea connector enables positioning the cables in an advantageous laying patterns and may be used in various applications and fields as to be described in the following.

The arrangement of the inventive subsea connector makes it feasible to carry out a side by side or essentially parallel installation of cables within a restricted installation area for instance for installment on a flowline or in a junction box.

The invention further concerns a cable arrangement for installment on a flow line. The cable arrangement comprises a subsea connector with the inventive aspects as presented above, a first cable and a second cable. The first cable comprises a piggyback cable arranged for attachment to the flowline. The piggyback cable has one end portion connected to the first joint device of the subsea connector and the other end portion (electrically) connected to the far end of the flowline. The second cable comprises a retrievable cable which may comprise a feeder cable, a riser cable or other riser connecting cable and has one end portion connected to the second joint device of the subsea connector and the other end portion of the retrievable cable is arranged for releasable attachment to the flowline. The U-shaped conductive member of the subsea connector in the installed position on the flowline provides for a cable connecting arrangement where at least a portion of the piggyback cable and at least a portion of the retrievable cable, extends in in an essentially parallel pattern from the subsea connector.

For establishing electrical connection between a topside power supply and the cable arrangement when installed on the flowline, the end portion of the second cable arranged as a retrievable cable (which may be a feeder cable, riser cable or other riser connecting cable) may be released from attachment to the flowline and brought into a connecting arrangement with the topside power supply to transfer electrical power to the piggyback cable.

Further the invention also concerns a junction box comprising a cable arrangement which comprises the subsea connector with the inventive aspects as presented above, and a first cable and a second cable. The first cable (which may comprise a riser cable, riser connecting cable or be one of plural cables making up a riser cable) has one end portion connected to the first joint device of the subsea connector and the other end portion of the first cable is arranged in a connecting arrangement for supply of electric power from a power source. The second cable (may comprise a feeder cable, a riser cable or other riser connecting cable) has one end portion connected to the second joint device of the subsea connector and the other end portion is arranged in a connecting arrangement supplying electric power to a cable arranged for heating a flowline. The U-shaped conductive member of the subsea connector in the installed position provides for a cable connecting arrangement where at least a portion of the first cable and at least a portion of the second cable extends in an essentially parallel pattern from the subsea connector. When the cable arrangement is installed in the junction box the first and second cables to be joined may extend from the same side of junction box. The second cable arranged for heating a flowline may be a piggyback cable.

A junction box may comprise one or plural cable arrangements as defined. When the first cable comprises a riser cable made up by plural cables, plural subsea connectors may be arranged in the junction box. The first joint of each of the subsea connectors may be connected to one of the plural cables, while the other joint device of the same subsea connector is connected to a second cable such as a feeder cable.

The invention also concerns a method for assembly and installation of a flowline arrangement. The flowline arrangement comprises a flowline, a first cable and a second cable for transfer of electric energy to the flowline. The first cable may comprise a piggyback cable and the second cable may comprise a feeder cable, a riser cable or other riser connecting cables.

The method comprises the following steps of
assembling the flowline arrangement by
    connecting one end of the first cable to a subsea connector which is installed on the flowline, wherein the subsea connector comprises a conductive member displaying a U-shape for transfer of electric power,
    connecting one end of second cable to the subsea connector,
    arranging the other end of the second cable releasably attached to the flow line,
    wherein at least a portion of the first cable and at least a portion of the second cable extends in in an essentially parallel pattern from the subsea connector,
laying the flowline assembly subsea and continuing the flowline with the first cable extending along the flowline to a designated installation point,
releasing the end of the second cable from attachment with the flowline and establish connection with a topside power supply for electric power transfer to the second cable.

This method simplifies and increases the efficiency of the installation, and the vessel wherefrom the laying procedure is executed may be positioned proximate to the production facility such as a platform or a Floating, Production, Storage and Offloading vessel (FPSO) when starting the installation. The inventive method makes it possible to start the installation at a near end location as opposed to prior art installations starting at the far end of the flowlines.

The first and second joint device of the subsea connector may be each be arranged as part of the conductive member or alternatively fixed to the cable(s) for connection with the conductive member. Alternatively, the first and second joint device may each be prepared as separate entities prepared for attachment with the cable(s) and the conductive member.

The first and second joint devices are provided to ensure a reliable mechanical and electrical connection between the cables and the conductive member of the subsea connector.

The conductive member of the subsea connector may be provided as a solid conductor, as a cable or as a stranded conductor made up by plural cables. When the conductive member is provided as a solid conductor it is preformed into a U-shape for instance by bending to obtain the radius of curvature of the subsea connector. A bolt device or other structures capable of bending to provide the U shape may be chosen as long as the chosen structure is capable of conducting electrical energy when connected to the cables. The solid conductor may comprise a copper bolt for instance made of a suitable copper alloy, but other materials such as aluminum or an aluminum alloy may a suitable conductive material.

Various embodiments of the first and second joint devices may be applicable for providing a sufficient connection between the first and second cables and the conductive member.

In an embodiment of the subsea connector, the first joint device may be provided having a first end connection portion for connection with an end portion of the conductive member and a second end connection portion for connection with an end portion of the first cable. The second joint device may have a first end connection portion for connection with an end portion of the conductive member and a second end connection portion for connection with an end portion of the second cable. At least one of these end connection portions may have an insert section for accommodation of the end portion of the first cable, the second cable or the conductive member. The insert section may be arranged for establishing a compressive connection with the end portion of the first cable, the second cable or the conductive member respectively. Alternatively, the insert section may be prepared threaded to provide a threaded connection with one of the cables and/or the conductive member respectively.

As previously mentioned the connection between the joint devices and the cables and conductive member respectively may be provided in various ways and in one embodiment at least one of the end connection portions may be arranged for attachment of the end portion of a cable or conductive member by fastening means for instance by bolts or other fixation means capable of establishing electrical conductivity as well as a reliable mechanical connection.

When the conductive member is made up by stranded cables the end connection portion may advantageously be prepared for attachment of the end portion of the conductive member by suitable fastening means such as bolt devices. Further if the conductive member is provided by a solid conductor the end connection portion of the belonging joint device may comprise an insert section such as for instance a compressive connection.

The first and/or second joint device may be arranged with first and second end connection portions having similar configuration or end connection portions that are differently shaped. As such first and second end connection portion may both be configured with insert sections for establishing a compressive connection, a threaded connection or one of each of these connections. Alternatively, one of the end connection portions may be arranged as an insert section while the other may be arranged for attachment of the end portion of cable or conductive member by fastening means, or both end connection portions may be provided with insert sections or arranged for attachment of the end portion of the cable or conductive member.

In the case when the conductive member is provided as solid conductor as explained previously, the conductive member may further be provided with a layered arrangement comprising at least one layer of semi conductive tape and at least one layer of insulating tape arranged in layers where the layer of insulating tape superposes the layer of semi conductive tape.

The layered arrangement may comprise a first layer of semi conductive tape in a wrap around the conductor. Then a first layer of insulating tape is arranged around the first layer of semi conductive tape. Then a second layer of semi conductive tape is arranged around the first layer of insulating tape and a second layer of insulating tape is arranged around the second layer of semi conductive tape.

Other alternative solutions may also be feasible for construction of the structure surrounding the conductive element for instance by embedding the conductive element by a moulded insulation system or other solutions suitable for subsea use.

The layered arrangement may be surrounded by a wrap tape layer and a heat shrink sleeve may be arranged around the wrap tape layer.

These and other characteristics of the invention will be clear from the following description of an exemplary embodiment, given as a non-restrictive example, with reference to the attached drawings.

BRIEF DESCRIPTION OF THE DRAWINGS

FIG. 6 shows another embodiment of the subsea connector shown arranged in the junction box as shown in FIG. 4a.

DETAILED DESCRIPTION

Figure 1:
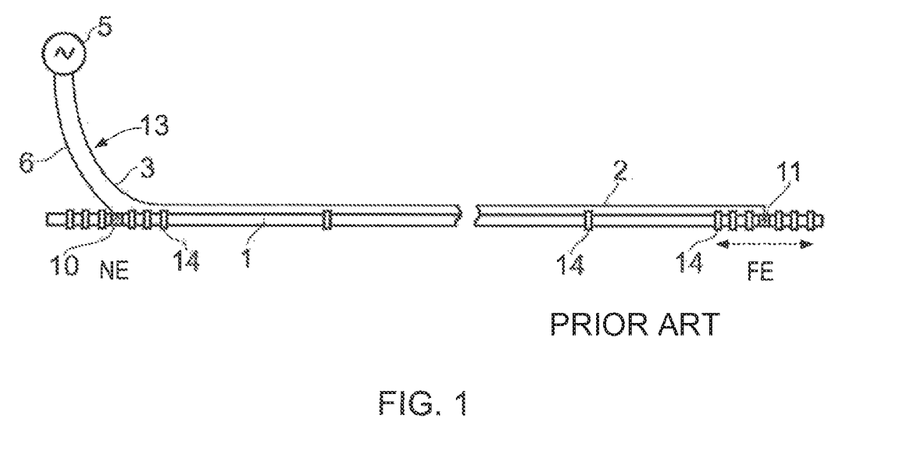
FIG. 1 is a schematic set up of a direct heating arrangement for heating of a flow line.

FIG. 1 is an illustration of the general set up for heating the flowline by a direct heating system (DHS). A power source 5 is arranged at a top side location for instance on a platform, a Floating, Production, Storage and Offloading vessel (FPSO) or similar structure that supplies electric power to heat a flowline 1 (or other kind of equipment to be installed subsea). A riser cable 13 as shown in FIG. 1 comprises a riser supply cable 3 with a conductor element (not shown) and a return supply cable 6 also with a conductor element (not shown), for conduction of an electric current. At a near end location NE the riser supply cable 3 is connected to a piggyback cable 2 and the riser return cable 6 is electrically connected to the flowline at riser connection point 10. The piggyback cable 2 which also comprises a conductor extends along the flowline 1 to the far end (FE) location of the flowline 1 and is electrically connected to the flowline at piggyback cable connection point 11. Electrical energy is supplied from the power source 5 through the riser supply cable 3, the piggyback cable 2 and returns in the flowline 1 due to the conductivity of the metallic flowline and back through the riser return cable 6. The flowline 1 is also provided with anode structures 14 for providing electrical connection with the sea water and a part of the return current passes through the sea water.

Figure 2:
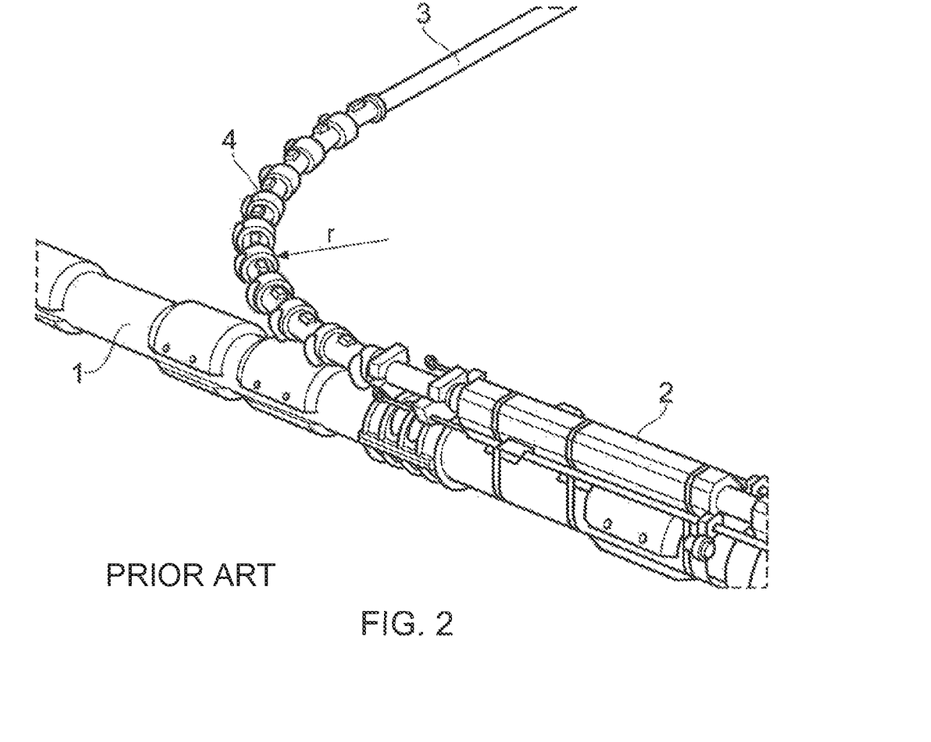
FIG. 2 is a schematic illustration of a prior art installation of a flowline with a piggyback mounted cable.

FIG. 2 shows an example of a conventionally installed flowline 1 with the piggyback cable 2 attached to the flowline 1. The installment is shown at the near end NE location where the riser supply cable 3 extending to a top side location (not shown) is connected to the piggyback cable 2 for supply of electrical power. The riser cable 3 is arranged with a bending restrictor 4 to avoid excess bending and damages to the cable. As illustrated in FIG. 1, the bending radius r is relatively large and thus it is not practically feasible to install the riser cable 3 connected to the piggyback cable 2, when installing the assembly of flowline 1 and piggyback cable 2 into a subsea installation position from an installation vessel (not shown). Consequently, the riser cable 3, or a riser connecting cable, needs to be installed after the installation of the assembly of flow line/piggyback cable has taken place. The flow line/piggyback cable installation then starts from the far end location towards the production facility such as a Floating, Production, Storage and Offloading vessel (FPSO) and the riser cable 3 is to be connected to the piggyback cable in a separate operation.

Figure 3:
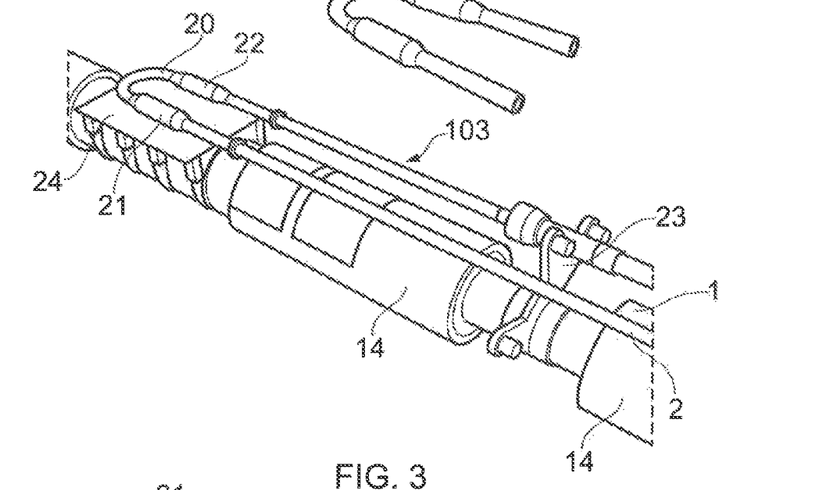
FIG. 3 shows an installation of a cable system on a flowline by use of the inventive solution.
Figure 4A:
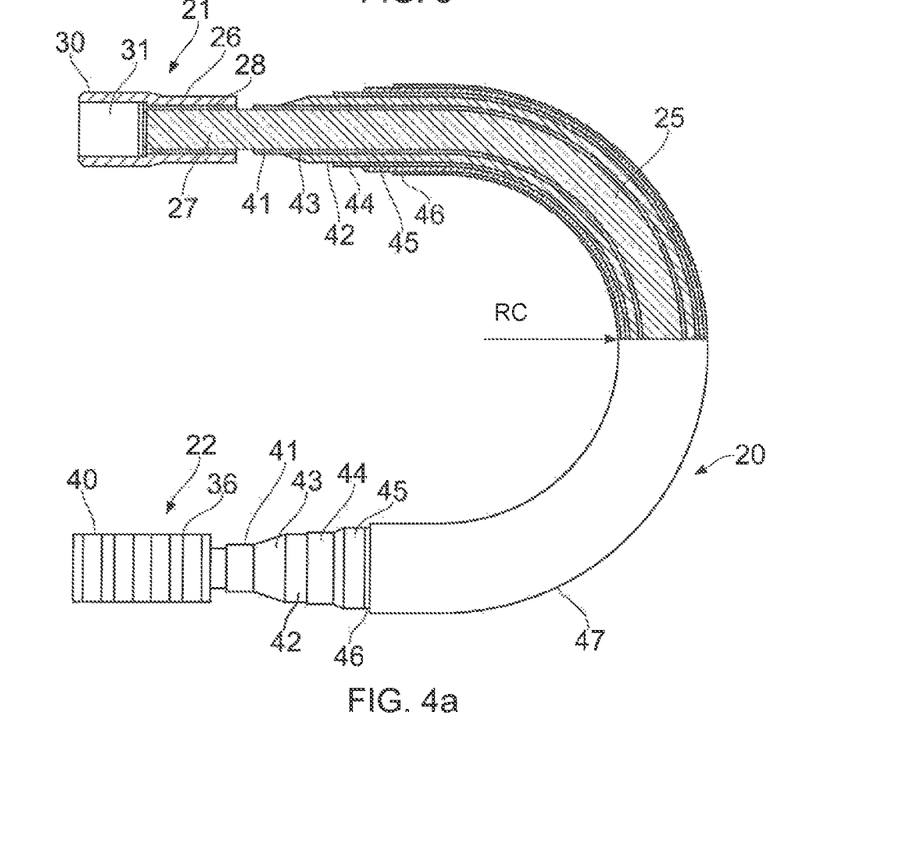
FIG. 4a shows a cross section of an embodiment of a subsea connector in accordance with the invention.

FIG. 3 shows a subsea connector 20 in accordance with the invention connecting a first cable and a second cable. In the shown embodiment the first cable is a piggyback cable 2 and the second cable is a retrievable cable 103 as illustrated. The retrievable cable 103 may be a riser supply cable, a riser connecting cable, a feeder cable or any other kind of riser connecting cable electrically connected with the riser supply cable to forward electrical energy from the top side power source 5 to the piggyback cable 2. The retrievable cable 103 is arranged releasably attached to the flowline 1 by a gripping bracket 23 fixed to the flowline 1 and is ready to be retrieved from this attachment in order to provide connection with the top side power source 5 for supply of electrical energy to the piggyback cable 2. The subsea connector 20 has a first joint device 21 for electrical and mechanical connection with the piggyback cable 2 and a second joint device 22 for electrical and mechanical connection with the retrievable cable 103. Upon connection with the top side power source 5 electric power is supplied through the retrievable cable 103 and a conductive member (not shown in FIG. 3, but an example of the conductive member is shown in FIG. 4a) of the subsea connector 20 to the piggyback cable 2. The piggyback cable extends to the far end of the flow line 1 as explained previously.

The subsea connector 20 has a U-shape configuration displaying a radius of curvature RC that is smaller than the minimum bending radius (MBR) of each of the retrievable cable 103 and the piggyback cable 2. The subsea connector 20 allows the connection of the cables having a relatively large diameter for instance 630-1600 mm$^2$, but also cross section down to 240 mm$^2$ or less may be used for specific circumstances. In some circumstances the diameter may even be larger than 1600 meters. The minimum bending radius (MBR) of each of the first and second cable is usually within the range of 1.5-3 m and the radius of curvature of the subsea connector may be as small as 0.1 meter. In other applications the radius of curvature of the subsea connector is defined as the minimum bending radius (MBR) of the first or second cable. Thus the radius of curvature of the subsea connector is defined in the range of about 0.1 meter to about the minimum bending radius (MBR) of the first or second cable.

Consequently, it is possible to install the riser supply cable 3 and the piggyback cable 2 on the flowline 1 extending from the connection with the subsea connector in a in a side by side pattern or in an essentially parallel manner. The subsea connector 20 is carried on the flow line 1 by a support structure 24 which is attached to the flowline 1.

An embodiment of the subsea connector 20 is illustrated in FIG. 4a. The conductive member 25 of the subsea connector 20 is shown as a solid conductor which is formed into a U-shape. The solid conductor may be made of copper or aluminum, or a copper alloy or an aluminum alloy.

A bolt or other kind of elongated members made of a conductive material that are capable of being pre-formed/pre-bent may be used as a conductive member. The conductive member 25 is formed into a U-shape with a configuration that provides the subsea connector 20 with a radius of curvature as illustrated, ensuring that the connecting cables, for instance the piggyback cable 2 or the retrievable cable 103, are displayed in a side by side or a parallel manner when being connected to the subsea connector 20.

The subsea connector 20 has first joint and second joint devices 21, 22 for connection of the subsea connector to the first and second cable such as the piggyback cable 2 and the riser supply 3 as shown in FIG. 3, or other cables that need to be connected in order to obtain a U-shaped laying pattern. The first and/or the second joint devices 21, 22 may be provided as separate entities connected to the conductive member 25 as shown in FIG. 4, or alternatively the first and/or the second joint devices 21, 22 may be provided as part of the subsea connector 20 for instance formed as end portions of the conductive member 25 arranged for connection to the first and second cable.

The first joint device 21 and second joint device 22 shown in FIG. 4a each has a first end connection portion 26, 36 (only the interior of the joint device 21 is shown in FIG. 4a) for connection with an end portion 27 of the conductive member 25. The first end connection portion 26 has an insert section 28 receiving the end portion 27 of the conductive member 25 in a compressive connection providing compressive forces around the end portion 27. Further the first joint device 21 and second joint device 22 also have a second end connection portion 30, 40. The second end connection is shown with an insert section 31 for receiving an end portion of the first cable (not shown in the figure) in a threaded connection.

In the embodiment shown in FIG. 4a, the interior configuration of the second end joint device 22 for providing a connection between the conductive member 25 and the second cable (not shown) is similar to that of the first end joint device 21. However, as the skilled person will realize, the first and second end connection portions of the first and second end joint device 21, 22 may have a different configuration than the one shown in FIG. 4. The first and second end connection portion may both be provided as threaded connections or as compressive connections. Further the first end joint device 21 and the second end joint 22 may have a different outlay than the one shown in FIG. 4a, as long as a reliable connection is obtained between the conductive member 25 and the first and second cable respectively.

The conductive member 25 is dressed with a wrapped first layer of semi conductive tape 41. A first layer 42 of insulating tape is arranged above the layer of semi conductive tape 41. The layer of insulating tape 42 is prepared with conic end portions 43. Superposing the layer of insulating tape 42 is a second layer of semi conductive tape 44 and above this layer a second layer of insulating tape 45. The layers of semi conductive tape and insulating tape is finished off with a wrap tape layer 46 and is completed with a sleeve 47, which is heat shrunk into position over the wrap tape layer 46. The radius of curvature RC is illustrated in FIG. 4a.

Figure 4B:
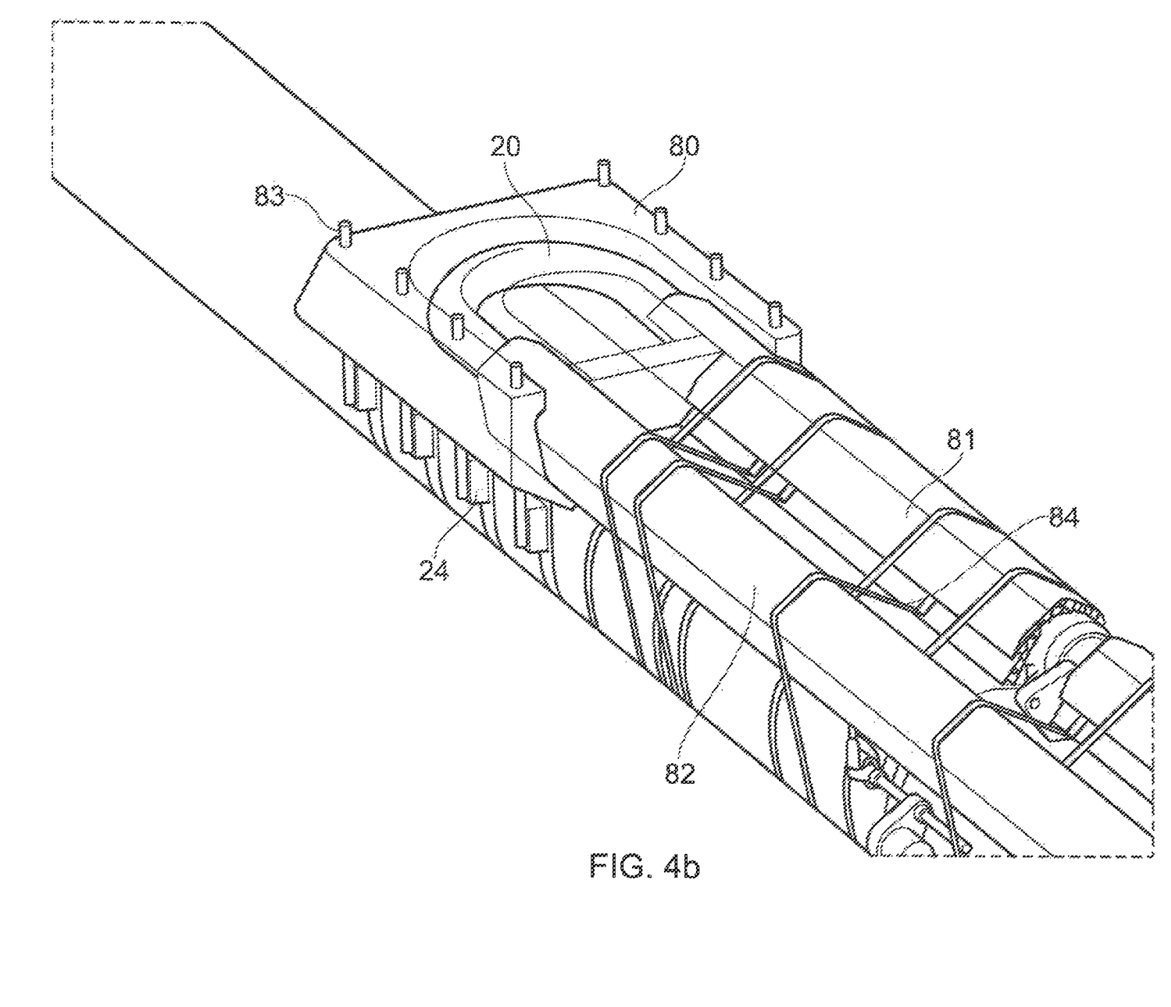
FIG. 4b shows an illustration of the subsea connector installed on the flowline.

FIG. 4b shows an illustration of the subsea connector 20 as supported on the flowline 1. The set up is similar to the installation as illustrated in FIG. 3. The support structure 24 is arranged with a subsea connector protective cover 80 for the subsea connector and the protective cover 80 is supported and connected to the support structure 24 by pins 83 projecting vertically from the support structure 24 and through corresponding installment holes in the subsea connector protective cover 80. The first and second cables are each accommodated in cable protective covers 81, 82. The cable protective covers 81, 82 are attached to the flowlines by strap elements 84 spaced axially along the flowline.

Figure 5:
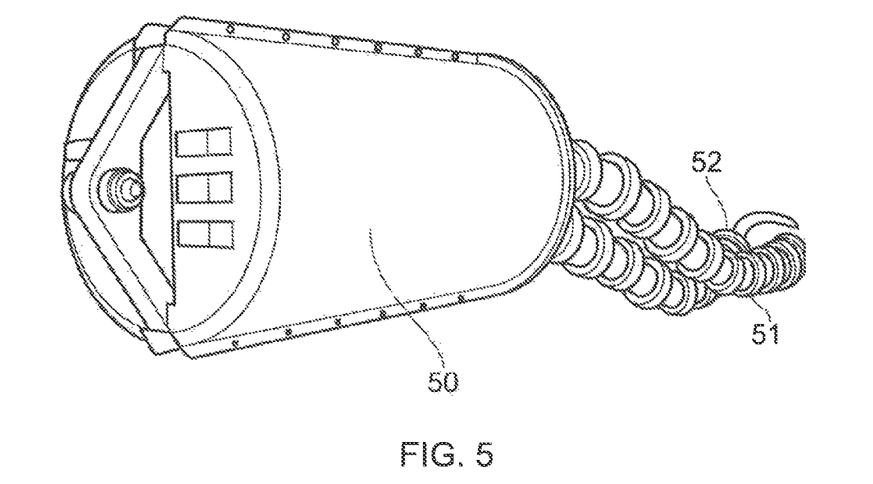
FIG. 5 shows the exterior of a junction box for subsea use.

The exterior of a subsea junction box 50 for connection of two cables is shown in FIG. 5. The first cable, which may be a riser 3 or riser supply cable 13 is illustrated with a bending restrictor 51 and the second cable which may be a feeder cable is illustrated with a bending restrictor 52.

Figure 6:
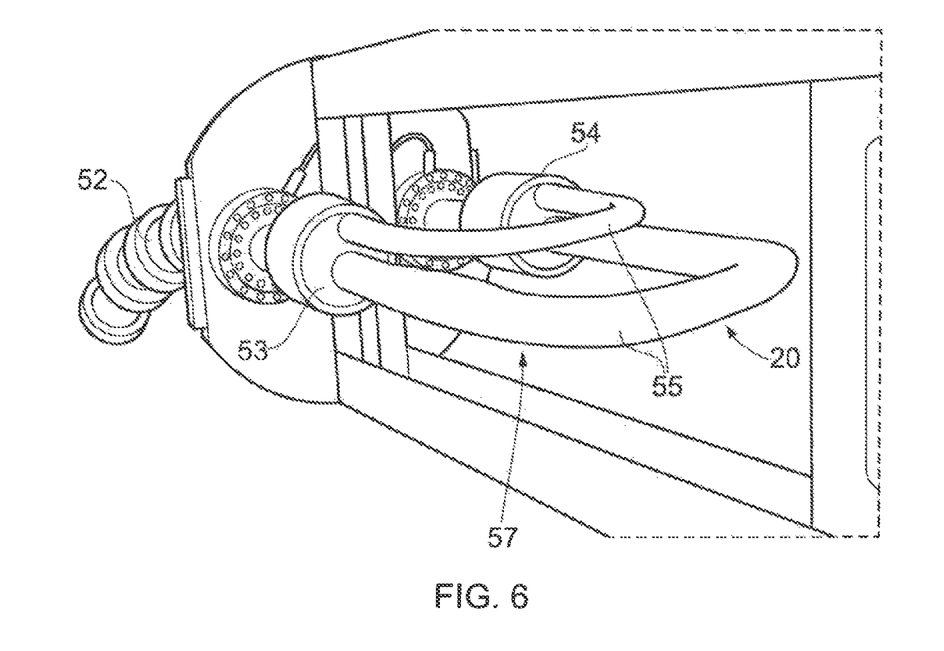

FIG. 6 shows the interior of the junction box 50 and the subsea connector 20 with a conductive member 57 comprising a stranded conductor made up by two cables 55 which is arranged in a U-shape configuration when installed in the junction box 50, thereby providing the radius of curvature of the subsea connector. The cables 55 are shown connected to the first and second joint devices 53,54. In addition to the mentioned connection of the riser supply cable and the feeder cable, the junction box may be used in various application subsea where cables are to be connected extending out from the same side of the junction box.

Figure 7:
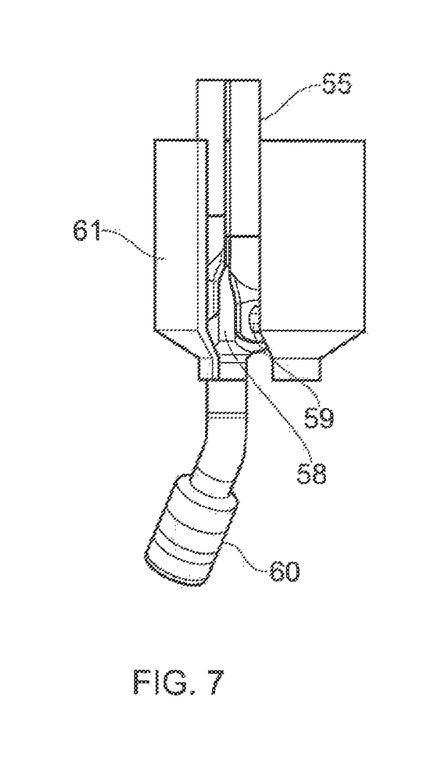
FIG. 7 is a detailed illustration of first and second joint devices of the subsea connector in FIG. 6.

FIG. 7 shows the built up of the first and second joint devices 53,54 of FIG. 6. The cables 55 of the conductive member 57 are shown attached to the first end connection portion 58 by fastening means 59, which in FIG. 7 is provided as bolts. A protection sleeve 61 encloses the cables 55 attachment to the first end connection portion 58. The second end connection portion 60 is provided as a compression connection for attachment to first and second cable respectively. This compression connection is similar to the one shown in FIG. 4. As the skilled person will realize, the first and second end connection portions of the first and second end joint device 53, 54 may have a different configuration than those shown in FIG. 4a.

Figure 8:
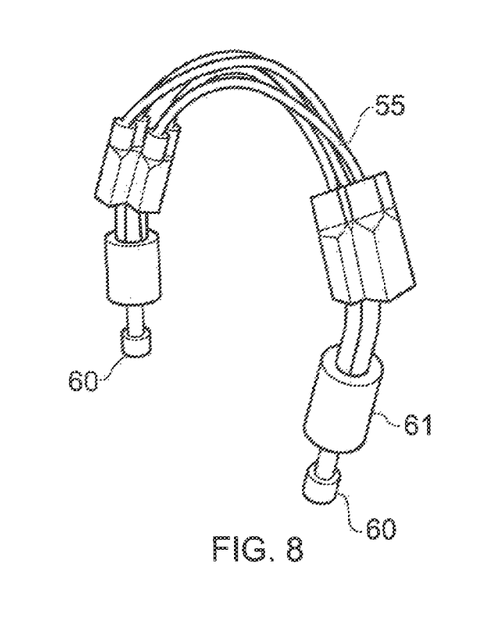
FIG. 8 shows the subsea connector of FIG. 6 shown uninstalled.

FIG. 8 shows the subsea connector 20 comprising a conductor made up by plural cables 55. The subsea connector is shown in a released mode disconnected from attachment with first and second cable. The subsea connector is shown displaying a U configuration. However it should be noted that as the conductor member of the subsea connector comprises cables, it does not necessarily assume a U shape when not installed, but will be arranged in a U-shape, when installed in a junction box as shown in FIG. 6 or when installed on a flow line.

Figure 9:
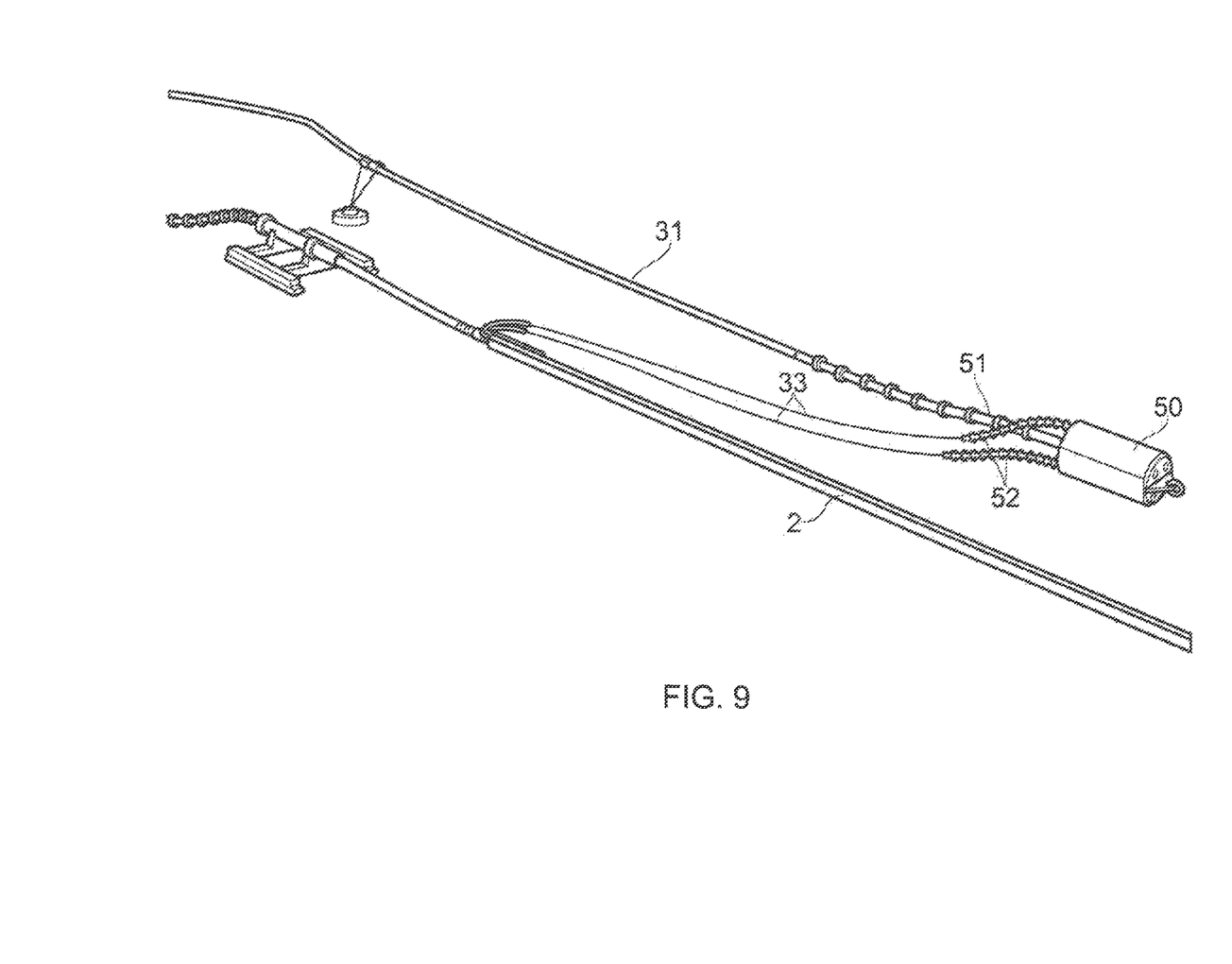
FIG. 9 is an overall view showing an example of a subsea installation of a junction box.

FIG. 9 shows an example of subsea installation of a junction box 90 with a riser cable here illustrated by a riser cable or a riser connecting cable 3 as illustrated with bending restrictor 51 and first and second feeder cables 33, 34 each arranged with bending restrictors 52.

Figure 10:
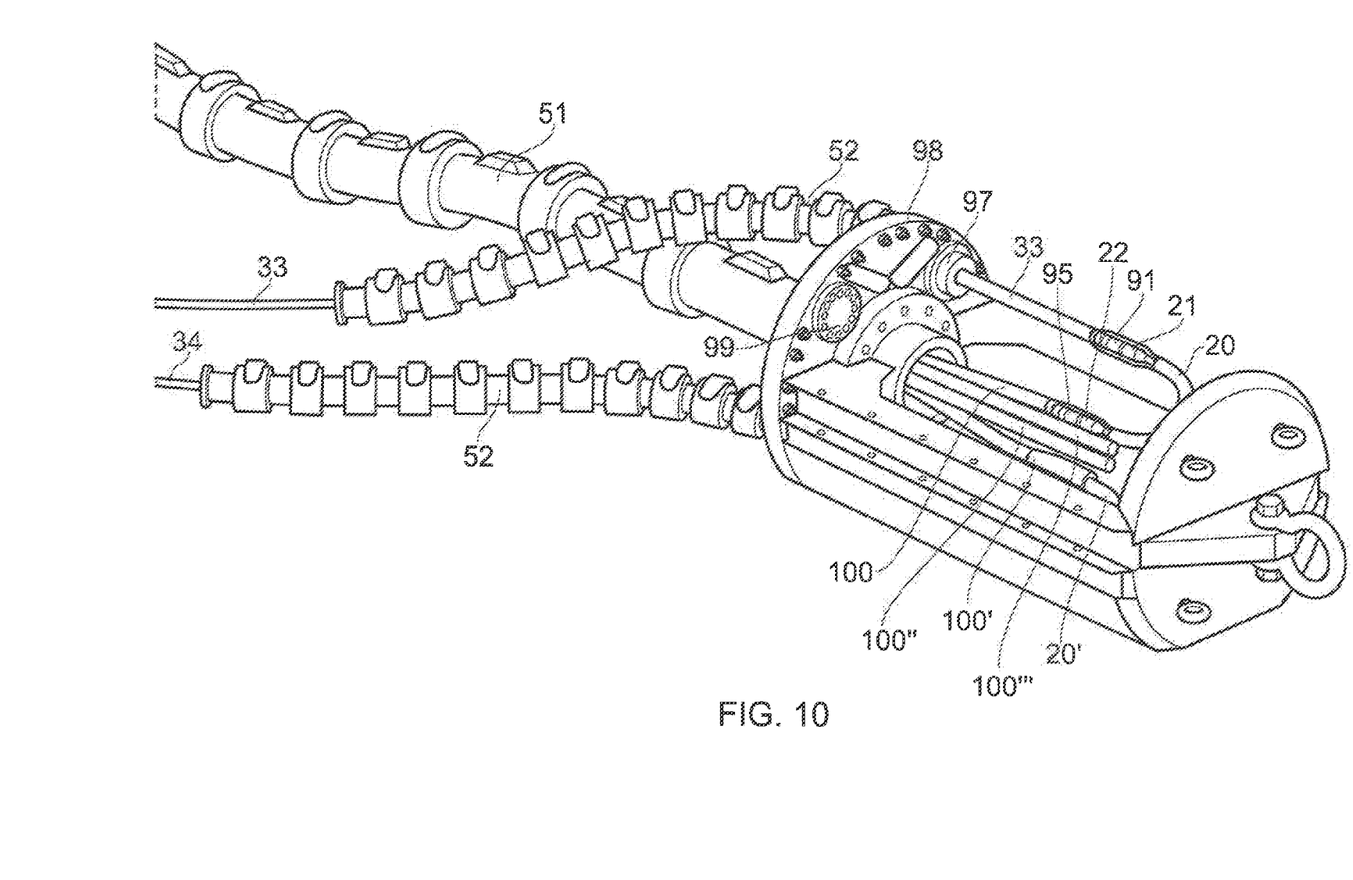
FIG. 10 shows the interior of the junction box of FIG. 9.
Figure 11:
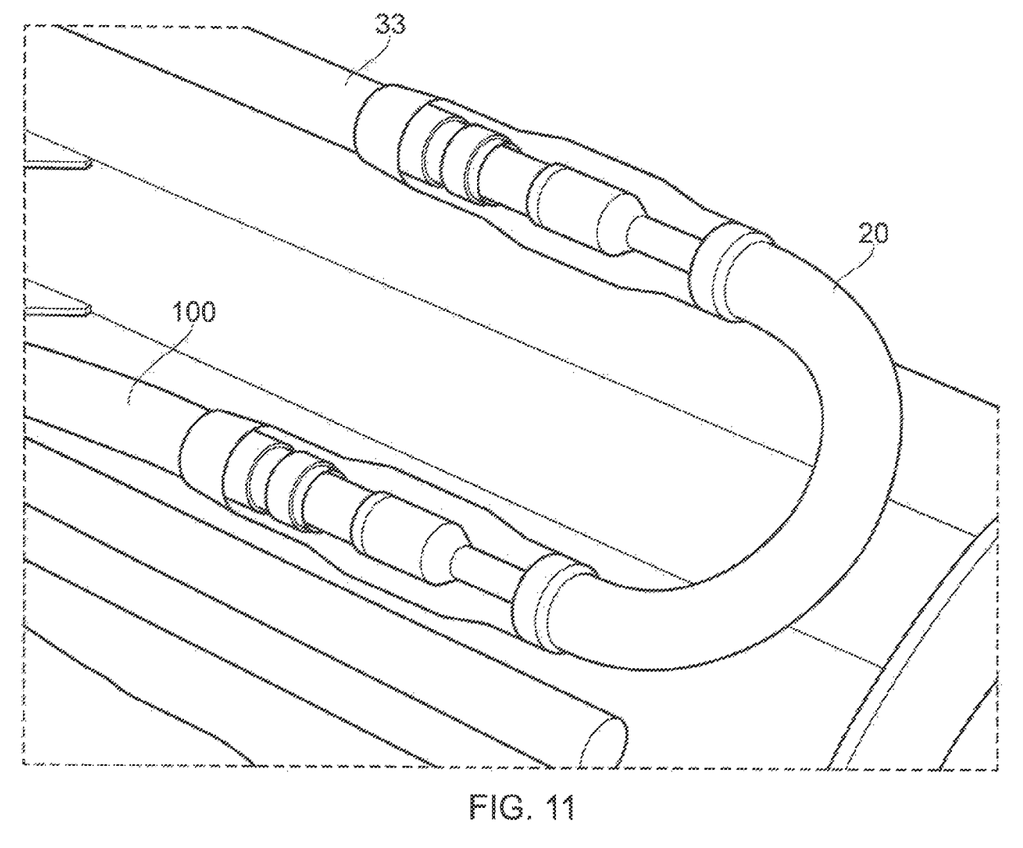
FIG. 11 shows a detail of the connection between the subsea connector and the cables in the junction of FIG. 10.

In FIG. 10 the interior of the junction box 90 shows the riser cable or riser supply cable 3 comprising a plurality of cables 100, 100', 100", 100'''. One subsea connector 20 connects one of the cables 100 and the feeder cable 33. Another subsea connector 20' connects the cable 100' and the feeder cable 34. The first and second joint device 21, 22 of the subsea connector 20 are shown in FIG. 11. End portions 91, 95 of the first feeder cable 33 and the cable 100 respectively are also illustrated. These joint devices are configured for fitting with the first and second joint device 21, 22. The feeder cable 33 extends through a passage fitting 97 arranged in a wall 98 of the junction box 50. As illustrated in FIG. 10, the interior of the junction box 50 leaves space for connection of additional cables and additional feeder cables. The wall 98 is arranged with removable covers as illustrated by 99 to be removed if there is a need for installation of another passage fitting for running an additional feeder cable through the wall 98.

FIG. 11 shows a section of the subsea connector 20 of FIG. 10 showing the connection between the first joint devices 21 of the subsea connector 20 and the first feeder cable 33 and the cable 100. The conductive member of the subsea connector 20 as illustrated in FIGS. 10 and 11 may comprise a solid conductor or a stranded conductor made up by plural cables 55 for instance as illustrated in FIG. 4a or FIG. 8.

Preferably a solid conductor may be applied when the conductive member is a high voltage conductor, whereas a stranded conductor may be preferred when the conductive member is a low voltage conductor, for instance as shown in FIG. 7.

The invention claimed is:

1. A subsea connector for joining a first cable having a first minimum bending radius and a second cable having a second minimum bending radius, wherein the subsea connector is arranged with a first joint device for connection with the first cable and a second joint device for connection with the second cable said subsea connector positioned as a separate element between, and connected to both, said first and second joint devices, said subsea connector comprises:
a conductive member for transfer of electric power between the first and the second cable, the conductive member being U-shaped with a radius of curvature less than or equal to the first and second minimum bending radii, such that at least a portion of the first cable extending from connection with the first joining device is arranged essentially parallel with at least a portion of the second cable extending from connection with the second joint device.

2. Subsea connector according to claim 1, wherein the first joint device has a first end connection portion for connection with an end portion of the conductive member and a second end connection portion for connection with an end portion of the first cable.

3. Subsea connector according to claim 1, wherein the second joint device has a first end connection portion for connection with an end portion of the conductive member and a second end connection portion for connection with an end portion of the second cable.

4. Subsea connector according to claim 2, wherein the first end connection portion has an insert section for accommodation of the end portion of the conductive member.

5. Subsea connector according to claim 2, wherein the second end connection portion has an insert section for accommodation of the end portion of the first cable.

6. Subsea connector according to claim 4, wherein the insert section is arranged for establishing a compressive connection for accommodation of the end portion of the first cable.

7. Subsea connector according to claim 4, wherein the insert section is arranged for establishing a compressive connection for accommodation of the end portion of the conductive member.

8. Subsea connector according to claim 4, wherein the insert section is arranged for establishing a threaded connection for accommodation of the end portion of the cable.

9. Subsea connector according to claim 4, wherein the insert section is arranged for establishing a threaded connection for accommodation of the end portion of the conductive member.

10. Subsea connector according to claim 2, wherein the first end connection portion is arranged for attachment of the end portion of the conductive member by fastening means.

11. Subsea connector according to claim 1, wherein the conductive member comprises a solid conductor preformed into a U-bend.

12. Subsea connector according to claim 11, wherein the solid conductor comprises a copper bolt device.

13. Subsea connector according to claim 1, wherein the conductive member is provided with a layered arrangement comprising at least one layer of semi conductive tape and at least one layer of insulating tape arranged in layers where the at least one layer of insulating tape superposes the at least one layer of semi conductive tape.

14. Subsea connector according to claim 13, wherein the layered arrangement comprises
a first layer of semi conductive tape in a wrap around the conductor member,
a first layer of insulating tape around the layer of semi conductive tape,
a second layer of semi conductive tape around the first layer of insulating tape,
a second layer of insulating tape around the second layer of semi conductive tape.

15. Subsea connector according to claim 14, wherein the layered arrangement is surrounded by a wrap tape layer and a heat shrink sleeve is arranged around the wrap tape layer.

16. Subsea connector according to claim 1, wherein the conductive member comprises a stranded conductor made up by plural cables.

17. Subsea connector according to claim 1, wherein the first and second minimum bending radii are within a range of 1.5-3 m.

18. Subsea connector according to claim 17, wherein the radius of curvature of the conductive member of the subsea connector is substantially in a range of 0.1 meter relative to the first and second minimum bending radii, said radii being within the range of 1.5-3 m.

19. A cable arrangement for installment on a flow line comprising:
the subsea connector according to claim 1,
the first cable comprising a piggyback cable arranged for attachment to the flowline, the piggyback cable has one end portion connected to the first joint device of the subsea connector and the other end portion electrically connected to the flowline,
the second cable comprising a retrievable cable has one end portion connected to the second joint device of the subsea connector and the other end portion of the retrievable cable is arranged for releasable attachment to the flowline,
wherein the U-shaped conductive member of the subsea connector in the installed position on the flowline provides for a cable connecting arrangement where at least a portion of the piggyback cable and at least a portion of the retrievable cable extends in a an essentially parallel pattern from the subsea connector.

20. A junction box comprising a cable arrangement which comprises
the subsea connector according to claim 1,
the first cable has one end portion connected to the first joint device of the subsea connector and the other end portion is arranged in a connecting arrangement for supply of electric power from a power source,
the second cable has one end portion connected to the second joint device of the subsea connector and the other end portion of the second cable is arranged in a connecting arrangement supplying electric power to a cable arranged for heating a flowline, wherein the U-shaped conductive member of the subsea connector in the installed position provides for a cable connecting arrangement where at least a portion of the first cable and at least a portion of the second cable extends in an essentially parallel pattern from the subsea connector.

21. Method for assembly and installation of a flowline arrangement, the flow line arrangement comprises a flowline, a first cable having a first minimum bend radius and a second cable having a second minimum bend radius for transfer of electric energy to the flowline, wherein the method comprises the following steps of     assembling the flow line arrangement by         connecting one end of the first cable to a subsea connector which is installed on the flowline, the subsea connector comprises a U-shape conductive member for transfer of         electric power said subsea connector positioned as a separate element between, and connected to both, said first and second cables,         connecting one end of the second cable to the subsea connector,         arranging the other end of the second cable releasably attached to the flow line,         wherein         at least a portion of the first cable and at least a portion of the second cable extends in an essentially parallel pattern from the subsea connector,     laying the assembled flowline arrangement and continuing the flowline with the first cable extending along the flowline to a designated installation point,     releasing the other end of the second cable from attachment with the flowline and establish connection with a topside power supply for electric power transfer to the first cable.

* * * * *